(12) United States Patent
Shi

(10) Patent No.: US 8,632,012 B2
(45) Date of Patent: Jan. 21, 2014

(54) FOCUS ADJUSTMENT WITH MEMS ACTUATOR IN IMAGING SCANNER

(75) Inventor: David T. Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 311 days.

(21) Appl. No.: 12/824,263

(22) Filed: Jun. 28, 2010

(65) Prior Publication Data

US 2011/0315772 A1    Dec. 29, 2011

(51) Int. Cl.
*G06K 7/10* (2006.01)

(52) U.S. Cl.
USPC ................................ 235/462.25; 235/462.01

(58) Field of Classification Search
USPC .............. 235/462.01–462.45, 472.01–472.03
See application file for complete search history.

(56) References Cited

U.S. PATENT DOCUMENTS

| | | | |
|---|---|---|---|
| 3,583,789 A * | 6/1971 | Rosenberger | 359/656 |
| 4,794,239 A | 12/1988 | Allais | |
| 4,877,949 A * | 10/1989 | Danielson et al. | 235/462.21 |
| 4,963,756 A | 10/1990 | Quan et al. | |
| 5,304,786 A | 4/1994 | Pavlidis | |
| 6,252,979 B1 * | 6/2001 | Lee et al. | 382/133 |
| 7,190,329 B2 * | 3/2007 | Lewis et al. | 345/7 |
| 2011/0290886 A1 * | 12/2011 | Carlson | 235/462.24 |

FOREIGN PATENT DOCUMENTS

EP    1460456    9/2004

OTHER PUBLICATIONS

International Search Report and Written Opinion dated Apr. 20, 2011 in related case PCT/US2010/0062459.
International Preliminary Report on Patentability dated Jan. 10, 2013 in related case PCT/US2010/062459.

* cited by examiner

*Primary Examiner* — Thien M Le
(74) *Attorney, Agent, or Firm* — Nong-Qiang Fan

(57) ABSTRACT

A method and apparatus for using in an imaging scanner. The apparatus includes a solid-state imager, an imaging lens assembly comprising a base lens and a MEMS lens, and an electric circuitry operative to transfer the image captured by the solid-state imager to a decoding circuitry. The imaging lens assembly is configured to focus light reflected from the target object onto the array of photosensitive elements in the solid-state imager by passing the light reflected from the target object through the base lens followed by the MEMS lens.

16 Claims, 6 Drawing Sheets

FOCUS ADJUSTMENT WITH MEMS ACTUATOR IN IMAGING SCANNER

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417, which are respectively described in U.S. Pat. No. 4,794,239 and U.S. Pat. No. 5,304,786.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

The performance of an imaging-based barcode reader for reading and decoding a barcode substantially depends upon the quality of the image of this barcode that is detected by the solid-state imager. The quality of the image depends upon whether the image is correctly focused on the solid-state imager. It is desirable to have an imaging-based barcode reader that can achieve focused images reliably over some range of working distances.

SUMMARY

In one aspect, the invention is directed to an apparatus for using in a barcode reader. The apparatus includes a solid-state imager, an imaging lens assembly comprising a base lens and a MEMS lens, and an electric circuitry operative to transfer the image captured by the solid-state imager to a decoding circuitry. The solid-state imager has an array of photosensitive elements for capturing an image from a target object having a barcode. The imaging lens assembly is configured to focus light reflected from the target object onto the array of photosensitive elements in the solid-state imager by passing the light reflected from the target object through the base lens followed by the MEMS lens. The base lens is configured to have an amplification factor that is at least ten times (10×) larger than the combined amplification factor due to any and all optical components in the imaging lens assembly positioned following the MEMS lens. In the imaging lens assembly, the MEMS lens includes a MEMS actuator and a lens attached on the MEMS actuator. The MEMS lens is configured to move the lens therein to cause a change of a distance between the lens therein and the solid-state imager when one or more control parameters are applied to the MEMS actuator.

Implementations of the invention can include one or more of the following advantages. For example, when the imaging lens assembly includes the base lens followed by the MEMS lens, it is possible to shift the object focus plane of the imaging scanner reliably by simply adjusting the voltage applied to the MEMS actuator in the MEMS lens. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
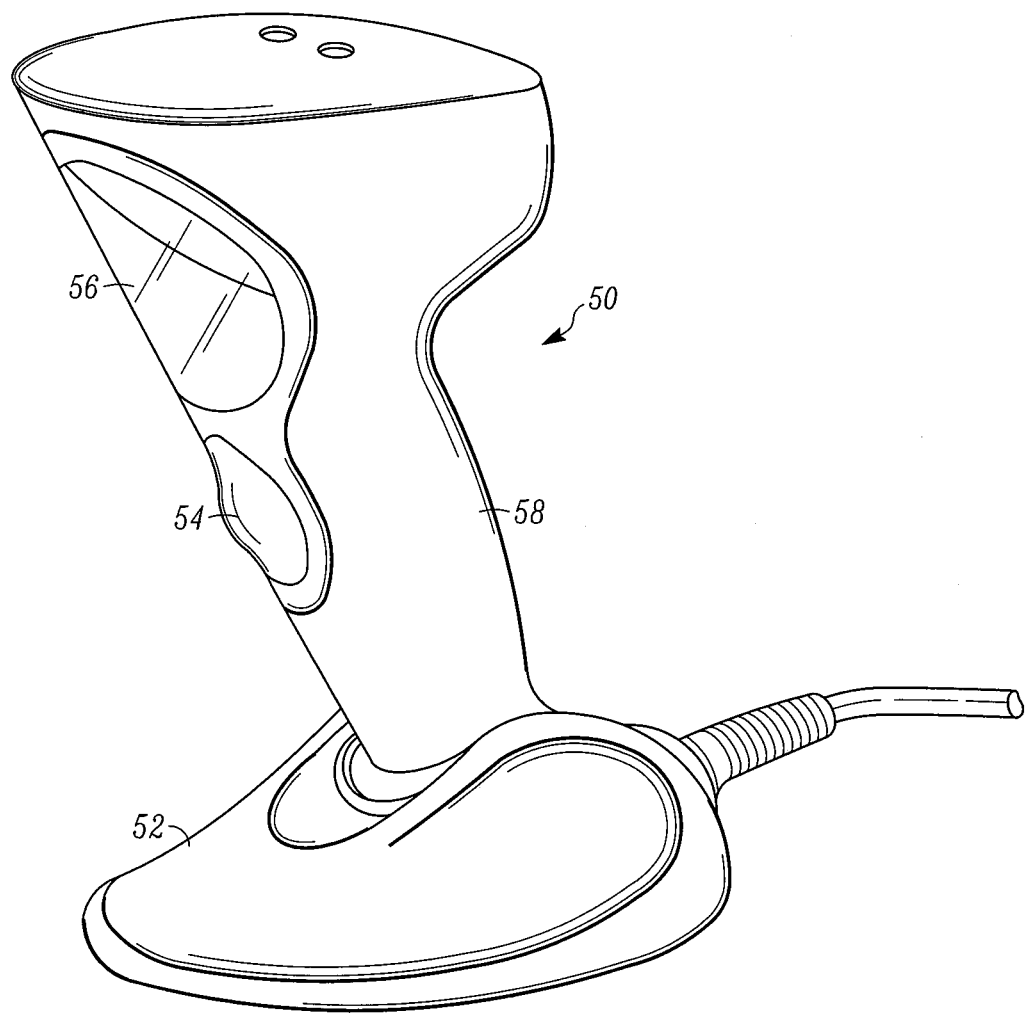
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
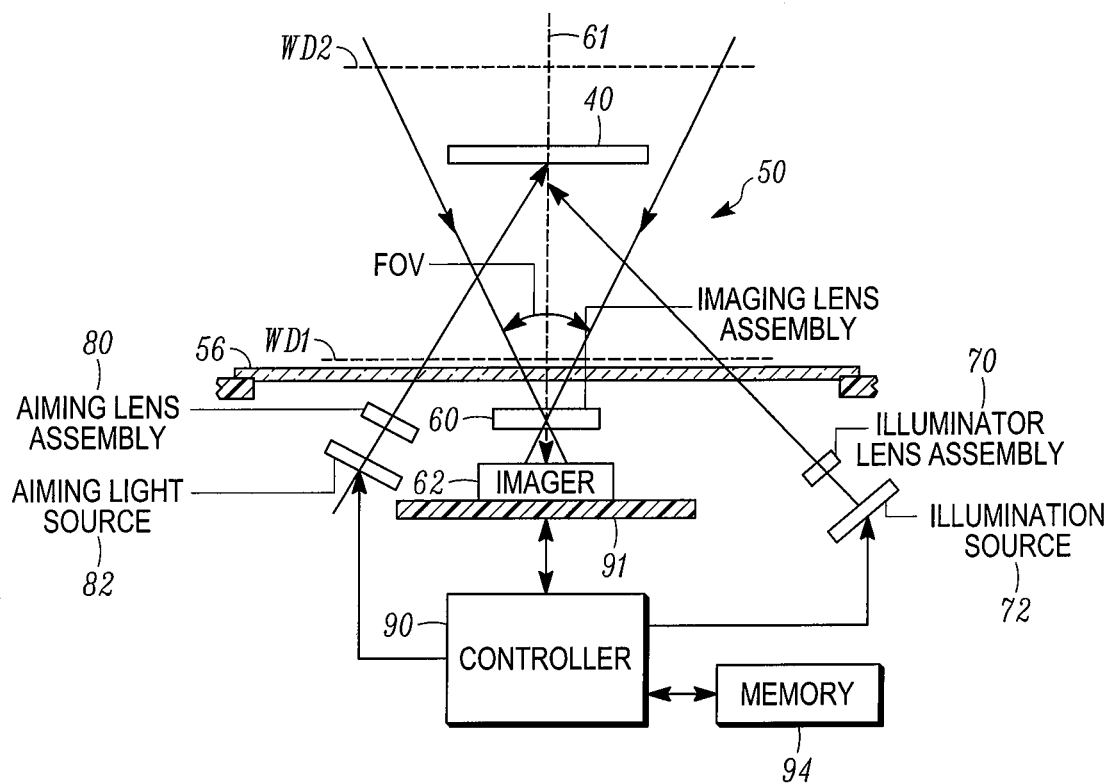
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) a solid-state imager 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical axis 61 through the window 56. Generally, the solid-state imager 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 2, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
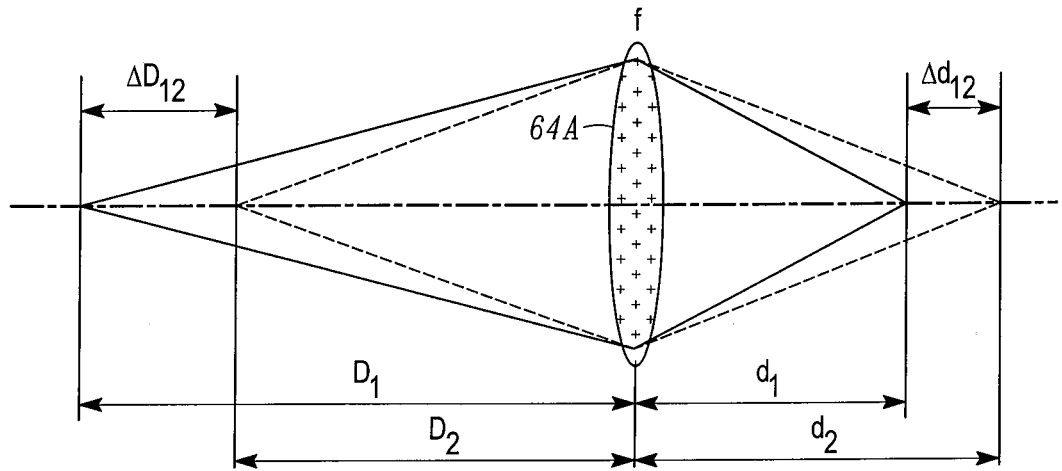
FIG. 3 illustrates how a change in the image focus plane is related to a change in the object focus plane for a lens.

FIG. 3 illustrates how a change in the image focus plane is related to a change in the object focus plane for a base lens 64A. In FIG. 3, the base lens 64A has a focus length f. As shown in FIG. 3, the base lens 64A focuses an object located at a distance $D_1$ from the lens system to an image focus plane located at a distance $d_1$ from the lens system, where the object distance $D_1$ and the image distance $d_1$ are related by the relationship $1/f=1/D_1+1/d_1$. Similarly, the base lens 64A focuses an object located at a distance $D_2$ from the lens system to an image focus plane located at a distance $d_2$ from the lens system, where the object distance $D_2$ and the image distance $d_2$ are related by the relationship $1/f=1/D_2+1/d_2$. It follows that $1/D_1-1/D_2=1/d_1-1/d_2$. Therefore, the change in the object distances is related to the change in the image distances by the following equation.

$$\Delta D_{12} = \frac{D_1 D_2}{d_1 d_2} \Delta d_{12} \approx M^2 \Delta d_{12}.$$

That is, the axial shift of the object focus point $\Delta D_{12}$ is closely related to the shift of the image focus point $\Delta d_{12}$ multiplied by the square of corresponding magnification M.

Figure 4:
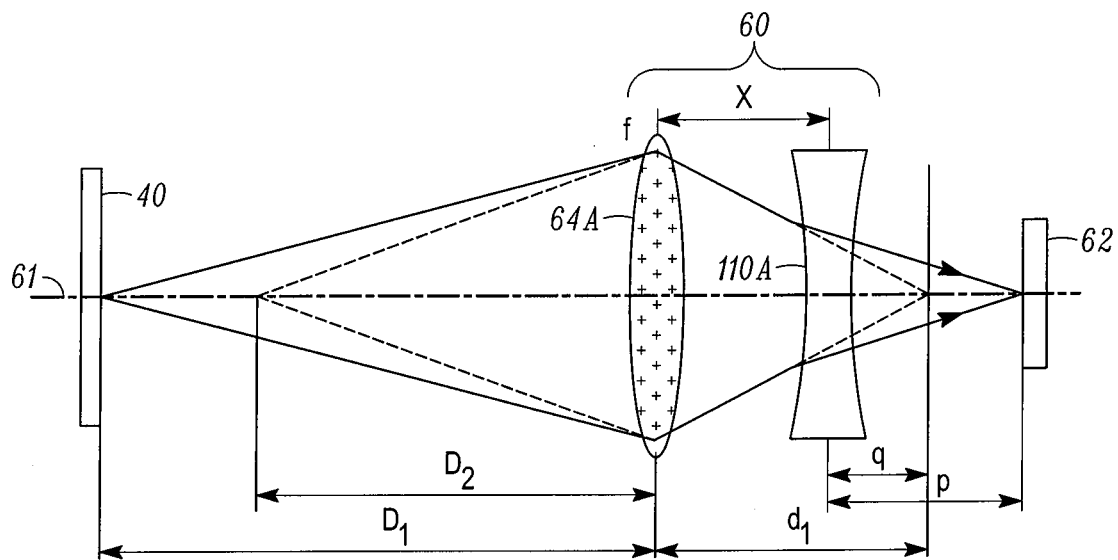
FIG. 4 illustrates an implementation of an imaging lens assembly for using in an imaging scanner in accordance with some embodiments.

FIG. 4 illustrates an implementation of an imaging lens assembly 60 for using in an imaging scanner 50 in accordance with some embodiments. The imaging lens assembly 60 in FIG. 4 includes the base lens 64A and a movable lens 110A positioned between the base lens 64A and the solid-state imager 62. The movable lens 110A is configured to move along the optical axis 61 for shifting the object focus point of the imaging scanner 50. Light from the barcode 40 located at an objective distance $D_1$ from the base lens 64A generates an image located at an image distance $d_1$. This image at the image distance $d_1$ is further focused on the solid-state imager 62 after passing through the movable lens 110A.

In FIG. 4, if the movable lens 110A is positioned at a distance X from the base lens 64A, the image of the barcode 40 at the image distance $d_1$ is located at a distance q from the movable lens 110A, that is, $q=d_1-X$. In addition, if the movable lens 110A is positioned at a distance p from the solid-state imager 62, the conjugate variables p and q satisfy the equation $1/q-1/p=1/f_M$, where $f_M$ is the focus length of the movable lens 110A. A small change $\Delta p$ of variable p is related to a small change $\Delta q$ in variable q by equation $$\frac{\Delta q}{q^2} = \frac{\Delta p}{p^2}.$$

In addition, as shown in FIG. 4, a small change $\Delta X$ in the distance X is related to a small change $\Delta p$ in variable p by equation $\Delta p=-\Delta X$. Consequently, a small change $\Delta X$ in the distance $X$ is related to a small change $\Delta d_1$ in the image distance $d_1$, that is, $$\Delta d_1 = \Delta(q+X) = \left(1 - \frac{(d_1-X)^2}{p^2}\right)\Delta X.$$

Therefore, the axial shift of the object focus point $\Delta D_1$ is related to the axial movement $\Delta X$ of the movable lens 110A by equation.

$$\Delta D_1 = M^2\left(1 - \frac{[D_1 f/(D_1-f)-X]^2}{p^2}\right)\Delta X$$

In an example where M=55 and q/p<<1, $\Delta D_1 \approx 3025 \Delta X$. If the movable lens 110A moves by $\Delta X \approx 0.1$ mm, the change of the focus plane for the object to be imaged is AD, 302 mm. Therefore, some small movement of the movable lens 110A can cause significant shift of the focus plane for the object to be imaged. In one of the concept prototypes, the focal plane was successfully moved from the near distance like around 58 mm to the far distance like around 350 mm. So the moving range of about 292 mm was achieved.

In the implementation as shown in FIG. 4, the base lens 64A has a positive optical power while the movable lens 110A has a negative optical power. In other implementations, the movable lens 110A can have a positive optical power. In still other implementations, the base lens 64A can be selected to have a negative optical power as well. The base lens 64A can be a simple lens or a compound lens. The movable lens 110A can also be a simple lens or a compound lens.

Figure 5A:
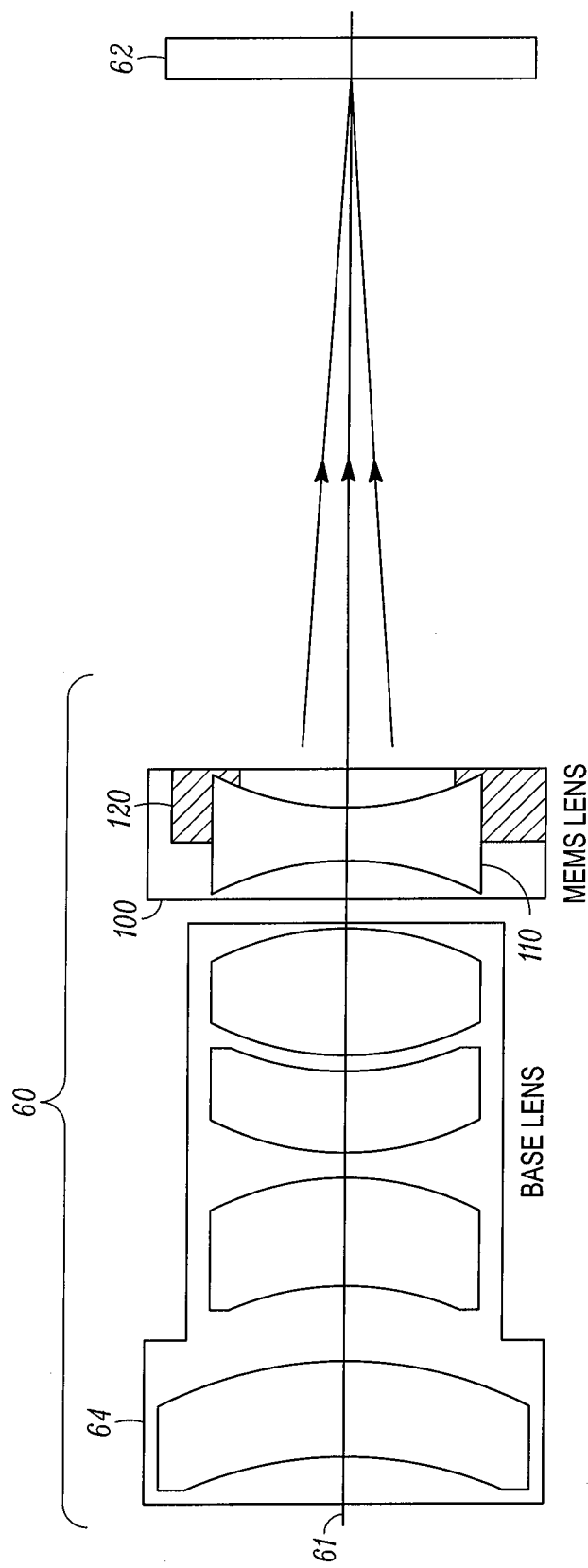
FIGS. 5A and 5B each depict an imaging lens assembly having a MEMS lens for using in an imaging scanner in accordance with some embodiments.
Figure 5B:
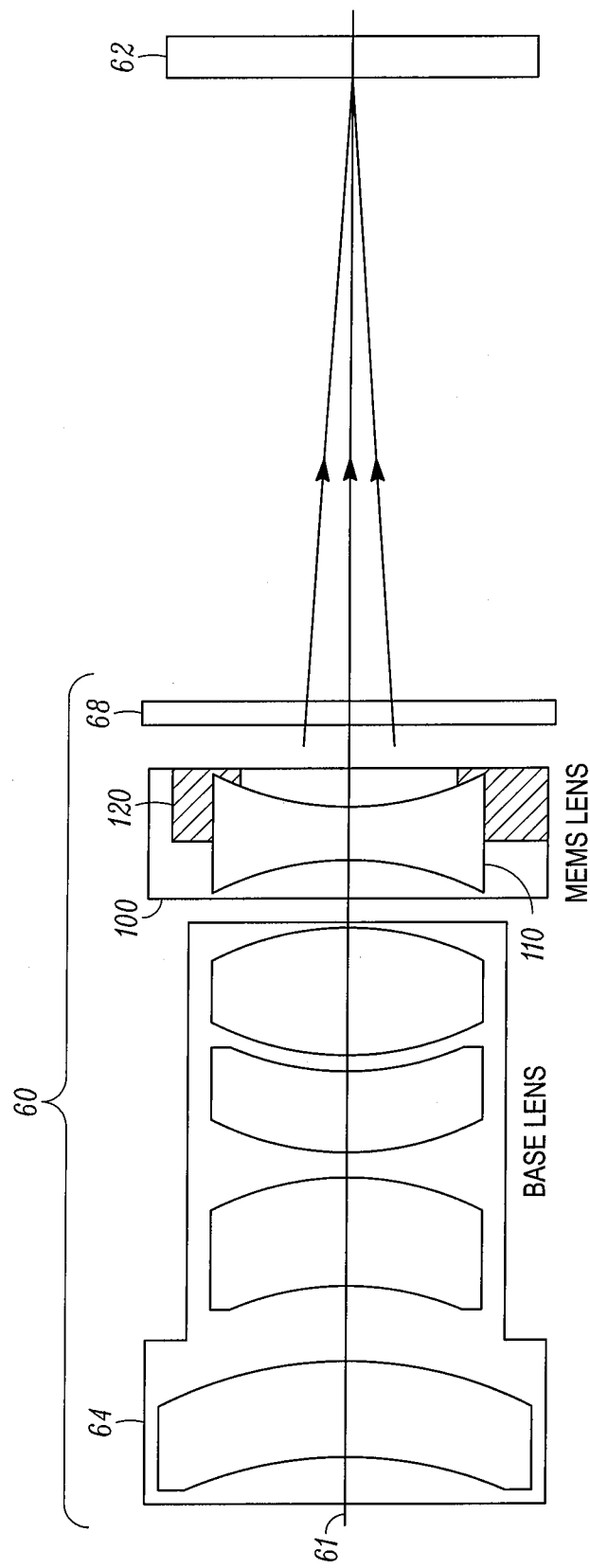

FIGS. 5A and 5B each depict an imaging lens assembly 60 having a MEMS lens for using in an imaging scanner 50 in accordance with some embodiments. The imaging lens assembly 60 includes a base lens 64 and a MEMS lens 100. The imaging lens assembly 60 is configured to focus light reflected from the target object onto the array of photosensitive elements in the solid-state imager 62 by passing the light reflected from the target object through the base lens 64 followed by the MEMS lens 100. In some preferred embodiments, the base lens 64 is configured to have an amplification factor that is at least ten times (10×) larger than the combined amplification factor due to any and all optical components in the imaging lens assembly 60 positioned following the MEMS lens 100. In some other preferred embodiments, the base lens 64 can be configured to have an amplification factor that is at least twenty times (20×) larger than the combined amplification factor due to any and all optical components in the imaging lens assembly 60 positioned following the MEMS lens 100.

In FIG. 5A, the imaging lens assembly 60 does not have other optical components positioned following the MEMS lens 100. After passing through the MEMS lens 100, image from the target object does not further amplified when passing through the remaining optical path in the imaging lens assembly 60. That is, the combined amplification factor due to any and all optical components in the imaging lens assembly 60 positioned following the MEMS lens 100 is just one (1×), and in some preferred embodiments, the base lens 64 should have an amplification factor larger than ten (10×).

In FIG. 5B, the imaging lens assembly 60 includes another optical component 68, such as, a window. Because the amplification factor due to the window positioned following the MEMS lens 100 is just one (1×), and in some preferred embodiments, the base lens 64 should have an amplification factor larger than ten (10×). If this optical component 68 has any optical amplification, for the preferred embodiments, the amplification factor of the base lens 64 should be adjusted accordingly. For example, if this optical component 68 has an amplification factor of 1.5, then, in some preferred embodiments, the amplification factor of the base lens 64 should have an amplification factor larger than fifteen (15×).

In FIGS. 5A and 5B, the MEMS lens 100 comprises a MEMS actuator 120 and a lens 110 attached on the MEMS actuator 120. The MEMS lens 100 is configured to move the lens 110 to cause a change of a distance between the lens 110 and the solid-state imager 62 when one or more control parameters are applied to the MEMS actuator 120.

Figure 6:
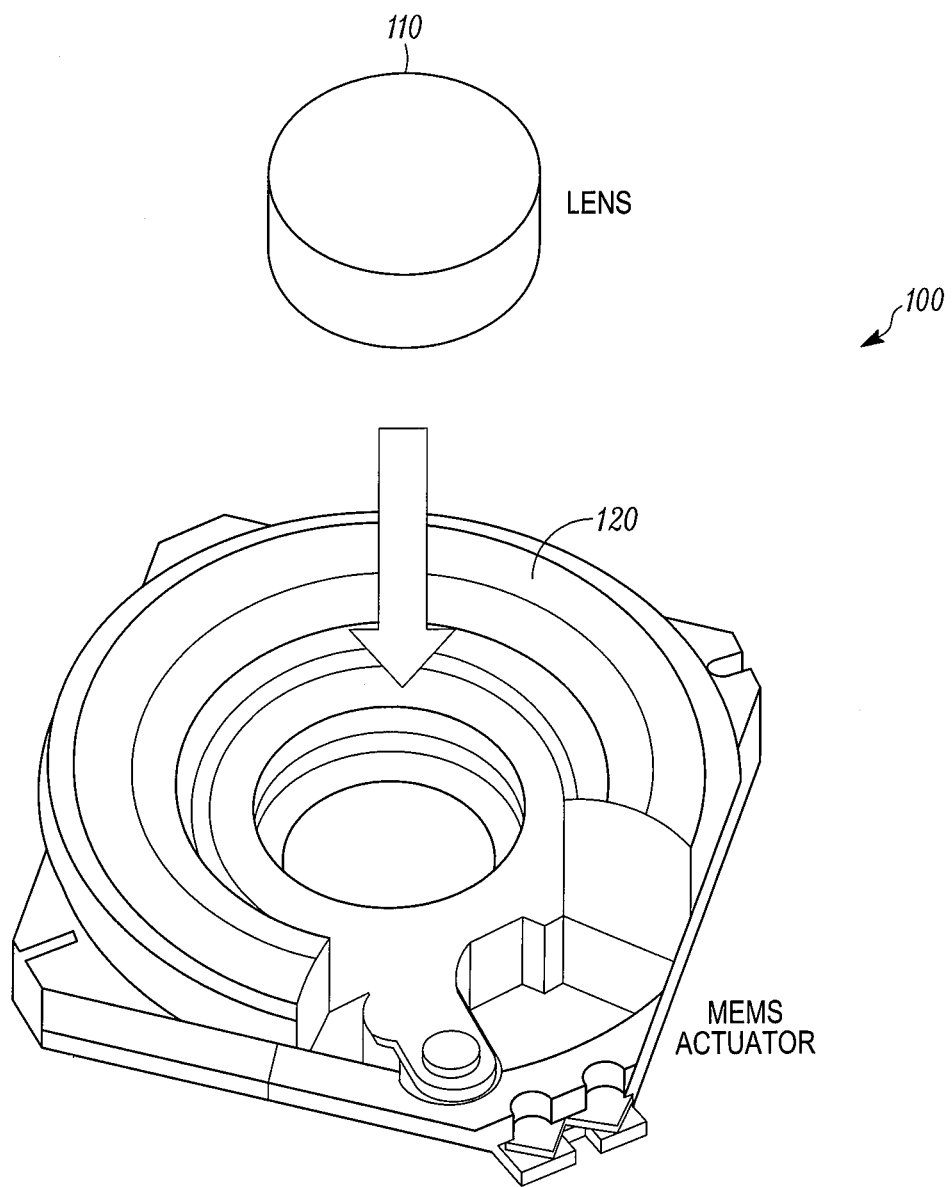
FIG. 6 depicts one specific implementation of the MEMS lens in accordance with some embodiments.

FIG. 6 depicts one specific implementation of the MEMS lens 100 in accordance with some embodiments. In FIG. 6, a lens 110 made of plastic material is attached to a MEMS actuator 120. In one example, the MEMS actuator 120 is a Siimpel MEMS Actuator model S23XS, made by Siimpel Corporation, which was later acquired by Tessera Technologies, Inc., headquartered in San Jose, Calif. In FIG. 6, the lens 110 can be moved in a direction along its optical axis when a voltage is applied to the MEMS actuator 120.

When the imaging lens assembly 60 includes both the base lens 64 and the MEMS lens 100, it is possible to shift the object focus plane of the imaging scanner 50 by simply adjusting the voltage applied to the MEMS actuator 120 in the MEMS lens 100. With such implementation, the MEMS actuator 120 only needs to move one plastic lens, which can be advantageous over some other designs of auto-focus system in which the whole image lens system is moved back and forth. In the embodiments as shown in FIGS. 5A and 5B, the major optical characteristics of the imaging lens assembly 60 can still be defined by the base lens 64, where the MEMS lens 100 only provides auto-focus functionality by moving the plastic lens back and forth inside the MEMS actuator 120.

With proper choose of certain image lens structure, the amount of travel and the size of clear aperture required for the MEMS lens 100 can be significantly reduced. The precision requirements in term of position and angular tolerances for the MEMS lens 100 can also be relaxed too because most of optical power and quality in the imaging lens assembly 60 can be inherited from the base lens 64, which can be handled efficiently by a conventional image lens system.

There are also other advantageous of using the MEMS lens 100 an auto-focus system for the imaging scanner 50. For example, because the MEMS lens 100 is located between the base lens 64 and the solid-state imager 62, it can be well shielded from outside world and closed inside the chassis chamber of the imaging scanner 50 for better environmental protection purpose. In addition, when the MEMS lens 100 covers the chassis chamber containing the solid-state imager 62, it can also can also function as dust cover to stop any dirt or dust from base lens or outside world to fall on the solid-state imager 62 which causes blemish issue on the picture quality. Furthermore, if the auto-focus function is not needed, the MEMS lens 100 can be easily removed from the imaging scanner 50, so the imaging lens assembly 60 can be converted into a fixed-focus system, for reasons of simplicity and cost effectiveness.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
an illumination source for providing illumination directed toward a target object;
a solid-state imager having an array of photosensitive elements for capturing an image from the target object;
an imaging lens assembly comprising a base lens and a MEMS lens having a negative optical power, the imaging lens assembly being configured to focus light reflected from the target object onto the array of photosensitive elements in the solid-state imager by passing the light reflected from the target object through the base lens followed by the MEMS lens, wherein the base lens is configured to have an amplification factor that is at least ten times (10×) larger than the combined amplification factor due to any and all optical components in the imaging lens assembly positioned following the MEMS lens;
wherein the MEMS lens comprises a MEMS actuator and a lens attached on the MEMS actuator, and the MEMS lens is configured to move the lens therein to cause a change of a distance between the lens therein and the solid-state imager when one or more control parameters are applied to the MEMS actuator; and
a decoding circuitry operative to decode a barcode on the target object from the image captured by the solid-state imager.

2. The apparatus of claim 1, wherein the base lens includes at least one of a simple lens and a compound lens.

3. The apparatus of claim 1, wherein the base lens has an amplification factor larger than twenty times (20×).

4. The apparatus of claim 1, wherein the lens in the MEMS lens is made of plastic material.

5. The apparatus of claim 1, wherein the lens in the MEMS lens includes a simple lens.

6. An apparatus comprising:
an illumination source for providing illumination directed toward a target object;
a solid-state imager having an array of photosensitive elements for capturing an image from the target object;
an imaging lens assembly comprising a base lens and a MEMS lens, the imaging lens assembly being configured to focus light reflected from the target object onto the array of photosensitive elements in the solid-state imager by passing the light reflected from the target object through the base lens followed by the MEMS lens, wherein the base lens is configured to have an amplification factor that is at least ten times (10×) larger than the combined amplification factor due to any and all optical components in the imaging lens assembly positioned following the MEMS lens;

wherein the MEMS lens comprises a MEMS actuator and a lens attached on the MEMS actuator, and the MEMS lens is configured to move the lens therein to cause a change of a distance between the lens therein and the solid-state imager when one or more control parameters are applied to the MEMS actuator;

a decoding circuitry operative to decode a barcode on the target object from the image captured by the solid-state imager; and wherein the lens in the MEMS lens includes a compound lens.

7. The apparatus of claim 1, further comprising:
an electric circuitry for applying a voltage to the MEMS actuator in the MEMS lens.

8. An apparatus for using in a barcode reader comprising:
a solid-state imager having an array of photosensitive elements for capturing an image from a target object having a barcode;
an imaging lens assembly comprising a base lens and a MEMS lens having a negative optical power, the imaging lens assembly being configured to focus light reflected from the target object onto the array of photosensitive elements in the solid-state imager by passing the light reflected from the target object through the base lens followed by the MEMS lens, wherein the base lens is configured to have an amplification factor that is at least ten times (10×) larger than the combined amplification factor due to any and all optical components in the imaging lens assembly positioned following the MEMS lens;
wherein the MEMS lens comprises a MEMS actuator and a lens attached on the MEMS actuator, and the MEMS lens is configured to move the lens therein to cause a change of a distance between the lens therein and the solid-state imager when one or more control parameters are applied to the MEMS actuator, and wherein the lens in the MEMS lens includes a compound lens; and
an electric circuitry operative to transfer the image captured by the solid-state imager to a decoding circuitry of the barcode reader.

9. The apparatus of claim 8, further comprising:
an electric circuitry for applying a voltage to the MEMS actuator in the MEMS lens.

10. A method comprising:
illuminating a barcode on a target object with an illumination source;
focusing light reflected from the target object with an imaging lens assembly onto an array of photosensitive elements in a solid-state imager by passing light reflected from the target object through a base lens followed by a MEMS lens having a negative optical power in the imaging lens assembly, wherein the base lens is configured to have an amplification factor that is at least ten times (10×) larger than the combined amplification factor due to any and all optical components in the imaging lens assembly positioned following the MEMS lens, wherein the MEMS lens comprises a MEMS actuator and a lens attached on the MEMS actuator;

wherein the focusing step comprises applying one or more control parameters to the MEMS actuator to move the lens therein to change a distance between the lens therein and the solid-state imager; and capturing an image of the barcode with the array of photosensitive elements in the solid-state imager; and decoding the barcode on the target object from the image captured by the solid-state imager.

11. The method of claim 10, wherein the base lens has an amplification factor larger than twenty times (20×).

12. The method of claim 10, wherein the base lens includes at least one of a simple lens and a compound lens.

13. The method of claim 10, further comprising
passing the light reflected from the target object first through the base lens and then through the MEMS lens having the lens therein made of plastic material.

14. The method of claim 10, further comprising
passing the light reflected from the target object first through the base lens and then through the MEMS lens having a simple lens therein attached to the MEMS actuator therein.

15. A method comprising:
illuminating a barcode on a target object with an illumination source;
focusing light reflected from the target object with an imaging lens assembly onto an array of photosensitive elements in a solid-state imager by passing light reflected from the target object through a base lens followed by a MEMS lens in the imaging lens assembly, wherein the base lens is configured to have an amplification factor that is at least ten times (10×) larger than the combined amplification factor due to any and all optical components in the imaging lens assembly positioned following the MEMS lens, wherein the MEMS lens comprises a MEMS actuator and a lens attached on the MEMS actuator;
wherein the focusing step comprises applying one or more control parameters to the MEMS actuator to move the lens therein to change a distance between the lens therein and the solid-state imager;
capturing an image of the barcode with the array of photosensitive elements in the solid-state imager;
decoding the barcode on the target object from the image captured by the solid-state imager; and
passing the light reflected from the target object first through the base lens and then through the MEMS lens having a compound lens therein attached to the MEMS actuator therein.

16. The method of claim 10, further comprising:
applying a voltage to the MEMS actuator in the MEMS lens.

* * * * *